US009256006B2

(12) United States Patent
Lundvall et al.

(10) Patent No.: US 9,256,006 B2
(45) Date of Patent: Feb. 9, 2016

(54) METHOD FOR PRINTING PRODUCT FEATURES ON A SUBSTRATE SHEET

(75) Inventors: Axel Lundvall, Solna (SE); Johannes Enlund, Solna (SE); Tobias Wedin, Stockholm (SE); Fredrik Gustavsson, Lidingö (SE)

(73) Assignee: Rolling Optics AB, Stockholm (SE)

( * ) Notice: Subject to any disclaimer, the term of this patent is extended or adjusted under 35 U.S.C. 154(b) by 423 days.

(21) Appl. No.: 13/579,746

(22) PCT Filed: Feb. 21, 2011

(86) PCT No.: PCT/SE2011/050192
§ 371 (c)(1),
(2), (4) Date: Aug. 17, 2012

(87) PCT Pub. No.: WO2011/102800
PCT Pub. Date: Aug. 25, 2011

(65) Prior Publication Data
US 2012/0321793 A1   Dec. 20, 2012

(30) Foreign Application Priority Data
Feb. 19, 2010   (SE) .................................. 1050158-3

(51) Int. Cl.
| B05D 5/00 | (2006.01) |
| G02B 3/00 | (2006.01) |
| B29D 11/00 | (2006.01) |
| B41M 3/00 | (2006.01) |

(52) U.S. Cl.
CPC .......... *G02B 3/0012* (2013.01); *B29D 11/00288* (2013.01); *B41M 3/003* (2013.01); *B41P 2200/30* (2013.01)

(58) Field of Classification Search
CPC .......... B41M 3/003; B29D 11/022888; G02B 3/0012
See application file for complete search history.

(56) References Cited

U.S. PATENT DOCUMENTS

| 4,676,157 A | * | 6/1987 | Ichikawa et al. .............. 101/155 |
| 5,331,891 A | | 7/1994 | Sugiyama et al. |
| 5,540,147 A | | 7/1996 | Johnson |
| 5,816,902 A | * | 10/1998 | Watanabe et al. .............. 451/532 |
| 2004/0130676 A1 | | 7/2004 | Doshi et al. |
| 2006/0158492 A1 | | 7/2006 | Odell et al. |
| 2007/0176995 A1 | | 8/2007 | Kadomatsu et al. |

(Continued)

FOREIGN PATENT DOCUMENTS

| EP | 600361 A1 | 6/1994 |
| JP | 63-64746 A | 3/1988 |

(Continued)

*Primary Examiner* — Xiao Zhao
(74) *Attorney, Agent, or Firm* — Dilworth & Barrese, LLP.

(57) ABSTRACT

The present invention provides a method of producing a product comprising an array of product features (3) arranged on a surface (7) of a substrate sheet (5), and an arrangement for the production of such products. In this method curable compound (13) is filled into recesses of a matrix (8), pre-cured and then printed onto the substrate sheet (5), thereby forming printed product features (3). These printed product features (3) and additional product features (2) arranged on the opposed side of the substrate sheet (5) may form image objects and focusing elements, respectively, of a synthetic image device. By way of example a cast cure step can be used to form the additional product features (2). Preferably the production of the product is performed in a continuous roll-to-roll process.

17 Claims, 4 Drawing Sheets

(56) References Cited

U.S. PATENT DOCUMENTS

| | | |
|---|---|---|
| 2008/0223240 A1 | 9/2008 | Drury et al. |
| 2009/0025595 A1 | 1/2009 | Mayers et al. |
| 2009/0085985 A1 | 4/2009 | Matsuzawa |
| 2009/0145314 A1 | 6/2009 | Botrie |
| 2009/0297805 A1 | 12/2009 | Dichtl |

FOREIGN PATENT DOCUMENTS

| | | |
|---|---|---|
| JP | 2-28458 A | 1/1990 |
| JP | 5-58287 U | 8/1993 |
| JP | 2002-258759 A | 9/2002 |
| JP | 2005-217051 A | 8/2005 |
| JP | 2006-193744 A | 7/2006 |
| JP | 2007-139898 A | 6/2007 |
| JP | 2007-230232 A | 9/2007 |
| JP | 2009-506908 A | 2/2009 |
| JP | 2009-73186 A | 4/2009 |
| JP | 2009-541873 A | 11/2009 |
| WO | 2004/027460 | 4/2004 |
| WO | 2009/085004 | 7/2009 |

\* cited by examiner

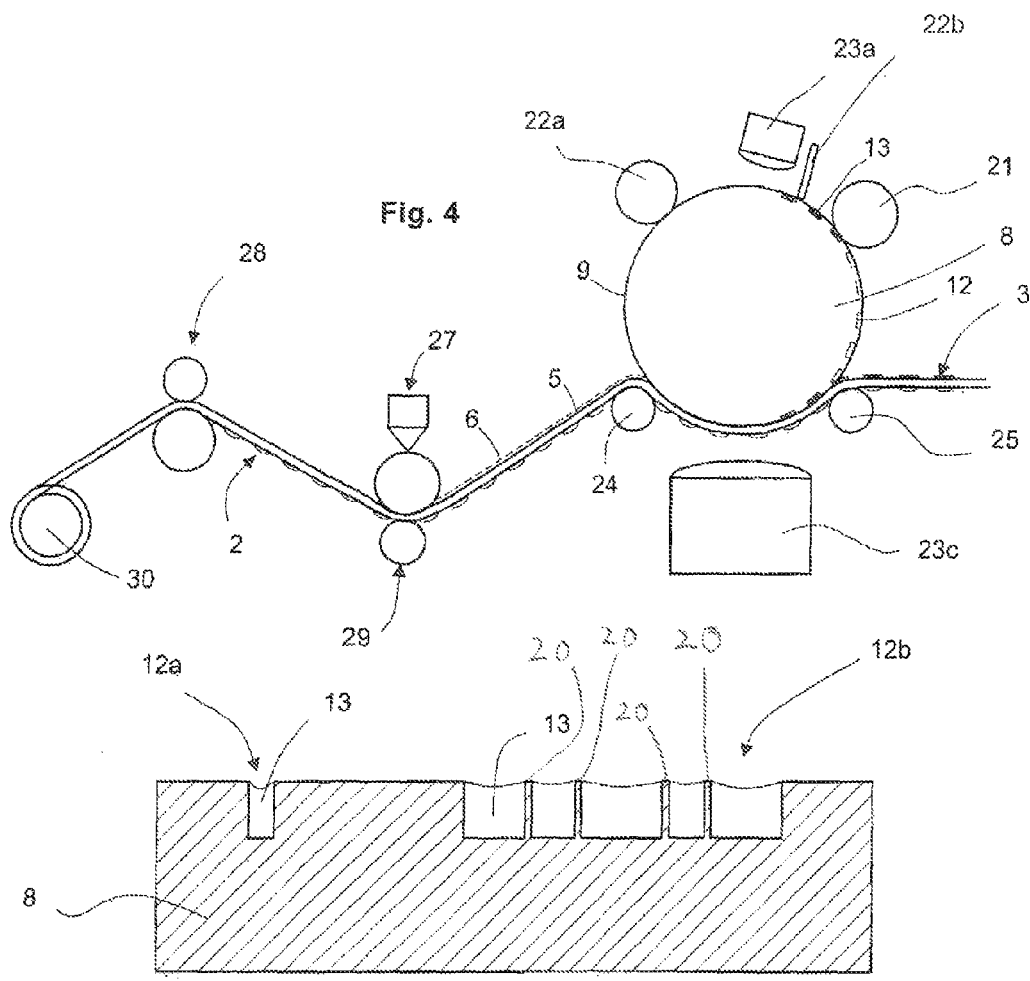
Fig. 4
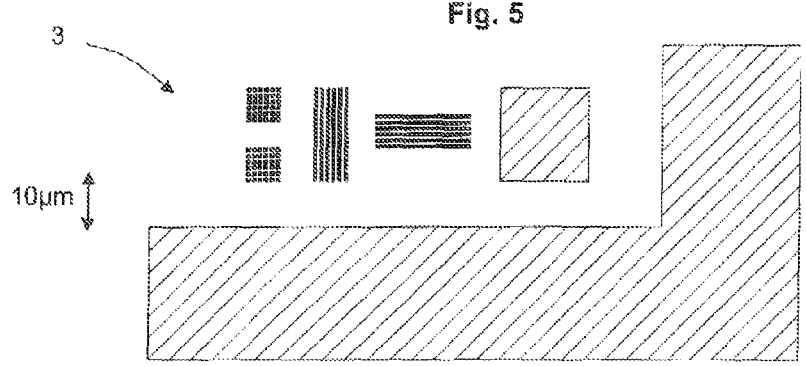
Fig. 5
Fig. 6

METHOD FOR PRINTING PRODUCT FEATURES ON A SUBSTRATE SHEET

TECHNICAL FIELD OF THE INVENTION

The present invention relates to products with printed product features arranged on a surface of a substrate sheet, and in particular to a method and an arrangement for producing such printed product features.

BACKGROUND OF THE INVENTION

In many applications an optical arrangement that provides a synthetic integral, possibly three dimensional, image for an observer is desired. FIGS. 1a and b schematically illustrate such an optical arrangement comprising an array of micro lenses 2 and an associated array of image objects 3 arranged on opposite sides of a transparent substrate sheet 5. In FIG. 1a, each micro lens 2 (circle) is arranged to magnify a small section 4 having width w of an associated image object 3 (square) so that a synthetic integral image 10 is perceived when viewed by an observer positioned at a distance from the array of micro lenses 2. The magnification effect, which in the field of art commonly is called "moiré-magnification", that can be achieved in this manner may be from a few times up to several thousand times, depending on the sizes and period of repetition of the arrays of micro lenses and image objects. However, in order to obtain a proper integral representation the alignment of the micro lenses with respect to the image objects is crucial.

WO 2009/085004 discloses a method for producing a microstructured product comprising an optical arrangement of this kind, means for registering mutual alignment of product features, such as micro lenses and image objects on opposite sides of a substrate sheet of the microstructured product, and an arrangement for continuous roll-to-roll processing of the microstructured product, which helps in avoiding misalignment. Image objects are formed by embossing cavities in the substrate sheet or by printing on the surface of the substrate sheet.

In addition to alignment, the resolution and dimensional accuracy of the image objects is of importance for the image quality. For example any lack of edge definition or other dimensional deviations of the image objects will be magnified in the perceived synthetic image. Additionally, the image objects can be coloured to obtain a black and white image, a greyscale image or a coloured image, or simply to provide proper optical properties. This colouring may be obtained by filling embossed cavities of the kind described above with ink, which is a challenging operation, in particular in large-scale production using for example the above mentioned roll-to-roll arrangement, since the embossed cavities, ranging from μm-sized cavities to cm-sized cavities, should all be equally filled without leaving residual ink on intermediate surfaces. Incomplete filling and residual ink on intermediate surfaces may be detrimental for the perceived quality of the image.

As mentioned above, as alternatives to the embossing and filling operation, conventional printing methods, such as offset printing, flexographic printing, ink-jet printing, etc. can be used to form the image objects, in any colour, directly on the surface of the substrate sheet. However, these conventional printing techniques cannot readily provide the high-resolution objects necessary for the synthetic image arrangement, or other products comprising product features having the same requirements.

SUMMARY OF THE INVENTION

One object of the invention is to print high accuracy product features on a surface of a substrate sheet.

The above object is, in a first aspect of the invention, achieved by a method of producing a product comprising product features arranged on a surface of a substrate sheet and, in a second aspect of the invention, achieved by an arrangement for producing such a product.

A method of producing a product comprising a plurality of printed product features arranged on a surface of a substrate sheet in accordance with the invention comprises the basic steps of:
 providing a matrix comprising a surface with a plurality of recesses;
 applying a curable compound to the matrix surface and the recesses so as to fill the recesses with a curable compound;
 increasing the viscosity of the curable compound;
 removing excessive curable compound from outside the recesses;
 transferring the curable compound in the recesses to the surface of the substrate sheet by bringing the matrix in contact with the surface of a substrate sheet, whereby the curable compound forms the printed product features on the surface of the substrate sheet.

These steps basically constitute a method for printing, however with improved resolution and dimensional accuracy of the printed objects, i.e. the printed product features. One reason for these advantageous properties is that a comparatively low viscosity can be used when filling the recesses and a comparatively high viscosity can be used when removing excessive curable compound, thereby optimising the viscosity of curable compound for these different steps. Another advantage of a comparatively higher viscosity is that the adhesive properties of the curable compound increases so that it may more easily be transferred from the matrix to the substrate sheet.

The increase in viscosity may be accomplished by at least partly curing the curable compound.

Adhesion of the curable compound to the substrate sheet can be improved by depositing a surface layer on the substrate sheet before bringing it into rolling contact with the matrix roll. The surface layer then functions as an adhesive layer during transfer of the curable compound or modifies the surface of the substrate sheet to improve the adhesive properties. The adhesive layer preferably comprises a, optionally pre-cured, curable compound. The surface layer may also serve as an offset layer that allows adjustment of the position of the printed product features in the direction of the height of the product.

Additional product features may be provided in additional steps prior to printing of the printed product features, each additional product feature being intended to be associated with a printed product feature on the opposite side of the substrate sheet, the printed product features and the additional product features forming image objects and focusing elements for a synthetic image device, respectively. Further additional product features or groups of product features associated with these product features, such as product features serving as registration structures enabling lateral alignment may also be provided using the same or different process steps.

Supporting structures can be used in the recesses to improve the filling properties. For a synthetic image device, these supporting structures are preferably distributed in an irregular manner in order to avoid reproducing any repeatable artefacts in the printed product features originating from these supporting structures.

An arrangement for continuous production of a product with printed product features arranged on a surface of a substrate sheet in accordance with the invention comprises:

a matrix roll comprising a circumferential surface with a plurality of recesses arranged to be in rolling contact with the substrate sheet;

an applicator arranged for application of curable compound onto the matrix roll;

removal means arranged after application of curable compound with the applicator to remove excessive curable compound outside of the recesses from the circumferential surface of the matrix roll; and curing means arranged at least in-between the applicator and the removal means for increasing a viscosity of the curable compound before removal of said excessive curable compound;

arranged such that the remaining curable compound filling the recesses is transferred to the substrate sheet during rolling contact.

Thanks to the invention it is possible to provide on the surface of the substrate sheet printed product features with high dimensional accuracy, with high repeatability and without leaving residuals on intermediate surfaces of the substrate sheet.

One advantage with the invention is that by printing product features instead of embossing of cavities and thereafter filling them with ink or the like, the extra step of embossing can be avoided. Furthermore, when embossing, the alignment of embossed product features in the thickness direction of the substrate sheet usually requires an offset with respect to the thickness of the substrate sheet to be taken into consideration. The surface of the substrate sheet to be printed with product features is thus preferably substantially flat and smooth. By printing the product features directly to the substrate sheet the relative position of product features on opposed sides of the substrate sheet can be simply determined by determining the substrate sheet thickness before printing. Optionally the substrate sheet thickness can, as mentioned above, during production be adjusted by depositing an offset layer on the substrate sheet before printing.

It is a further advantage of the invention to provide a method and an arrangement for continuous processing of said products with printed product features arranged on a surface of a substrate sheet.

A yet further advantage is that the method and arrangement of the invention provides products having product features with improved dimensional tolerances and less artefacts, such as residual ink in-between product features, thereby enabling moiré magnification, allowing the generation of synthetic image devices and permitting the use of lenticular lenses. All of these require accurately printed product features since the use of them means that any artefact or deviation in dimension is magnified and possibly perceived by an observer.

Thus, the method and the arrangement of the present invention enable printing of product features on substrate sheets with printing accuracy with respect to lateral resolution, edge definition and dimensional tolerances in three dimensions that is not achievable with conventional printing techniques.

Embodiments of the invention are defined herein. Other objects, advantages and novel features of the invention will become apparent from the following detailed description of the invention when considered in conjunction with the accompanying drawings.

BRIEF DESCRIPTION OF THE DRAWINGS

Preferred embodiments of the invention will now be described with reference to the accompanying drawings, wherein:

FIG. 4 schematically illustrates another embodiment of a roll-to-roll arrangement for production of a product according to the invention;

FIG. 5 schematically illustrates supporting structures in large recesses according to the invention;

FIG. 6 schematically illustrates a top view of printed product features of varying size in accordance with the invention;

FIG. 7b illustrates an enlarged view of the portion of the wiping arrangement within the dotted box in FIG. 7a.

DETAILED DESCRIPTION OF EMBODIMENTS

A product according to the invention comprises a body that in the product, or in an intermediate product, constitutes a substrate sheet with a limited thickness in relation to the extension in orthogonal directions thereof, and having product features arranged on, or in, one or both principal surfaces of the substrate sheet. By way of example, one embodiment of said product may comprise primary product features on a first side of a substrate sheet and secondary product features on the opposed side of the substrate sheet, the primary product features being associated with the secondary product features. Other embodiments of said product may comprise three or more sets of product features. In its most basic form the product comprises a substrate sheet with product features printed on only one surface thereof.

The product features can be used for different purposes, for example as structural and/or functional elements in a synthetic image device, as described above, or in other devices such as optical devices, electronic devices, microfluidic devices, display devices, electrochemical devices, electrochromic devices, bioassay devices, etc or simply as printed ink in printed matter. In most of these applications the product features often have to be provided with high resolution and high dimensional tolerances since the functionality of the product is coupled to the dimensions and/or distribution of the product features. Often the product features also have to be small to obtain the desired effect.

Figure 1A:
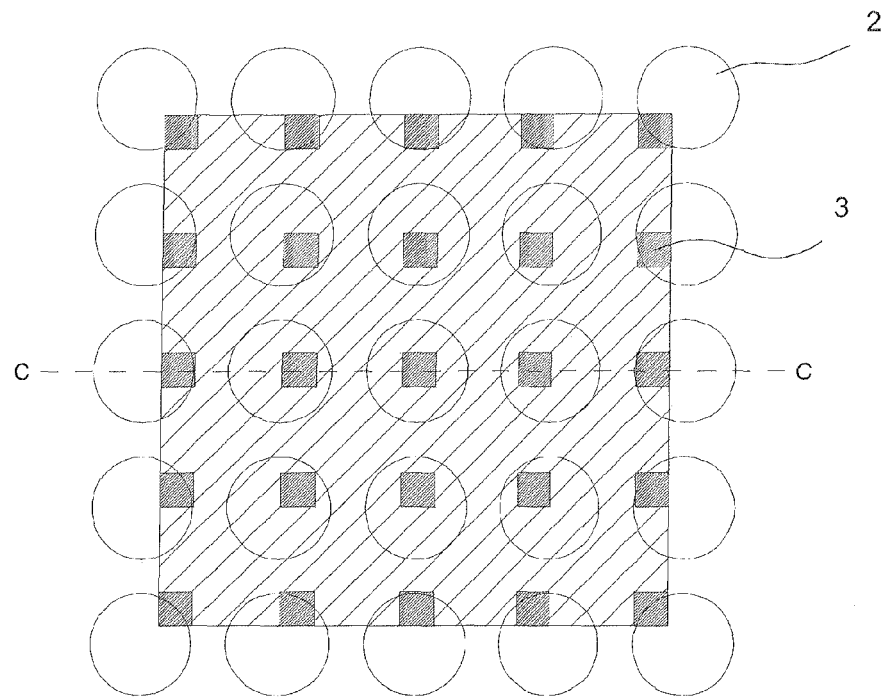
FIG. 1a-b schematically illustrates the principles behind an image representation of Moiré-type according to prior art.
Figure 1B:
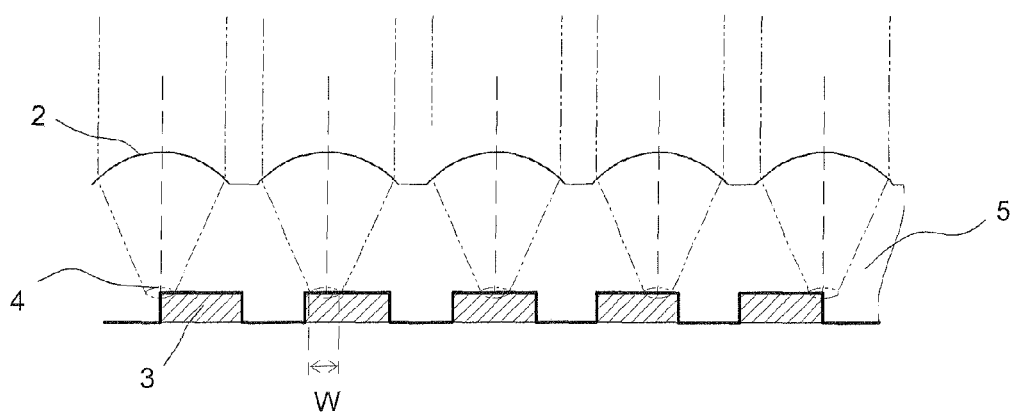
Figure 2:
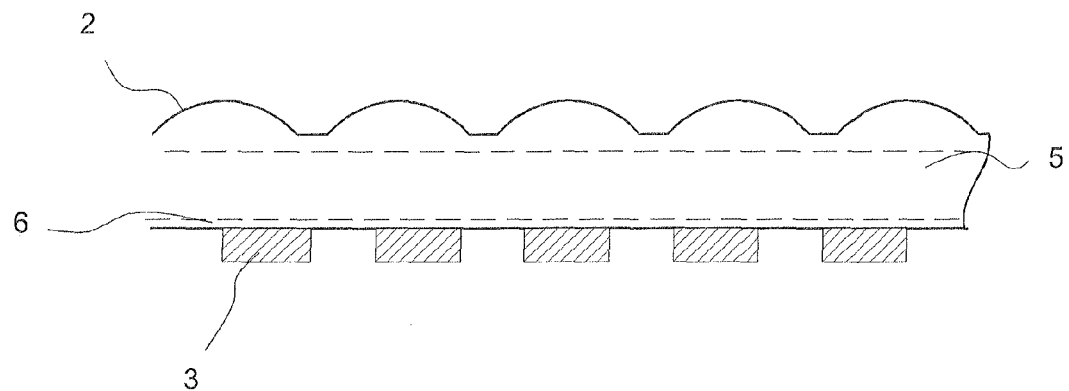
FIG. 2 schematically illustrates a product comprising an array of printed image objects in accordance with the invention.

For illustrative purposes FIG. 2 shows a product in accordance with one embodiment of the invention comprising an array of micro lenses 2 and an associated array of image objects 3 respectively arranged on opposite sides of a transparent substrate sheet 5. The invention is mainly described in terms of such an arrangement, however the present invention is not limited to this. This is similar to the prior art micro-structured product of FIG. 1, but in the present invention the image objects 3 are printed directly on the surface of the substrate sheet 5, or on one or more surface layers 6 (one such layer is shown, indicated by a first dotted line) arranged on the substrate sheet 5, without pre-structuring the substrate sheet 5, or surface layer 6, for filling. The micro lenses may have been formed by embossing in the substrate sheet or by a cast cure process in a separate layer (indicated by a second dotted line) on the substrate sheet 5. Although embodiments of the invention are exemplified with micro lenses it should be appreciated that other elements capable of focusing at a section of, and/or restricting the view of, an associated image object can be used to obtain an integral representation. Examples of such focusing elements are micro lenses, apertures and lenticular lenses.

A method of producing a product comprising a plurality of printed product features 3 arranged on a surface 7 of a substrate sheet 5 in accordance with the invention comprises the basic steps of:
- providing a matrix 8 comprising a matrix surface 9 with a plurality of recesses 12;
- applying a curable compound 13 to the matrix surface 9 and the recesses 12 so as to fill the recesses 12 with a curable compound 13;
- removing excessive curable compound (13) from outside the recesses (12); and
- transferring the curable compound 13 in the recesses 12 to the surface 7 of the substrate sheet 5 by bringing the matrix 8 in contact with a surface 7 of the substrate sheet 5 such that, when releasing the matrix from the substrate sheet 5 the curable compound 13 is attached to the substrate sheet 5 in order to form printed product features 3 on the surface 7 of the substrate sheet 5.

These steps form a method for printing a plurality of product features 3 on a surface 7 of a substrate sheet 5 and the method possesses some similarity to conventional Intaglio printing, but since Intaglio printing cannot readily provide high-resolution and high accuracy product features the method according to the invention is significantly different to Intaglio printing.

In order to avoid printing of curable compound on intermediate surfaces, i.e. between and outside the printed product features, on the substrate sheet any excess of curable compound 13 in areas of the matrix surface 9 of the matrix 8 outside the recesses 12 is removed such that the curable compound 13 transferred to the substrate sheet 5 substantially originates from the recesses 12. By way of example, a squeegee or the like can be used to wipe off any excessive curable compound 13 from the matrix surface. Excessive curable compound 13 can also be removed by polishing. Different means for removal of excessive curable compound can also be combined.

The curable compound 13 is preferably at least partly cured at some stage of the processing of the product. The curable compound 13 can be of a wide range of materials and hence curing may be accomplished by different mechanisms. Normally the term curing is associated with polymerisation of polymer materials initiated by irradiation, such as irradiation with ultraviolet (UV) light, and/or heating. Infrared irradiation, electron beam irradiation and the addition of chemical additives are other examples of means for curing. The curable compound 13 may comprise non-curable constituents as well. For the purpose of this application the term curing also includes drying. As in many conventional printing techniques different kind of inks may be used for the curable compound 13. Preferably inks with dyes are used. Pigments may cause problems when printing small product features since the size of pigments particles usually is too large, which may adversely affect the resolution and colour density of the printed product features.

Ideally the curable compound 13 initially has a low viscosity in order to enable the filling of small recesses 12. This low viscosity is typically between 100 and 600 mPas. However, when removing excessive curable compound, e.g. using a squeegee or a polishing means, curable compound 13 may be removed from the recesses 12, in particular recesses having a comparatively large open surface as compared to the depth thereof, due to capillary forces acting on the low-viscosity curable compound. Thus a higher viscosity of the curable compound is desired while removing excessive curable compound 13. These contradictory requirements regarding the viscosity of the curable compound may overcome when having equally sized recesses since the viscosity can be adapted for the size of the recesses, but the problem is augmented when using recesses having sizes varying over a wide range, and in particular when the matrix 8 comprises recesses having a large open surface, i.e. a large width or diameter and a comparatively shallow depth. Therefore the method of the invention preferably comprises the step of increasing the viscosity of the curable compound 13 after filling of the recesses 12, i.e. the viscosity is lower during filling than during removal of excess curable compound. Preferably the viscosity of the curable compound is increased before removal of excess curable compound such that the curable compound behaves like a paste that is not significantly affected by capillary forces.

An increase in the viscosity of the curable compound 13 applied to the matrix 8 can be obtained by at least partly curing the curable compound 13. The viscosity can also be controlled by other means such as by reducing the temperature of the curable compound 13.

The extent of curing of the curable compound 13 also has an effect on the ability to transfer the curable compound 13 in the recesses 12 to the substrate sheet 5, i.e. the ability to withdraw the curable compound 13 from the recesses 12. The extent of curing can be controlled before removal, but also the curable compound 13 remaining in the recesses 12 after removal of excessive curable compound can be further cured prior to and/or during contact with the substrate sheet 5. By leaving the curable compound 13 partly uncured in some cases the adhesion to the substrate sheet 5 will be improved.

In one embodiment of the invention the curable compound 13 in the recesses is substantially fully cured before being brought in contact with the substrate sheet 5.

As indicated above, the step of removal of the excessive curable compound on intermediate surfaces may be influenced by the properties of the curable compound 13. The step of removal can be accomplished using polishing means that comprises pores or cavities, such as a fibre cloth, collecting the removed excessive curable compound. When the viscosity of the curable compound is low enough to fill small recesses, it is possible that during polishing capillary forces withdraw part of the curable compound 13 from the recesses (this is known as "dimpling")—which is undesirable. An increase of the viscosity before polishing in accordance with the invention enables accurate removal since the withdrawal due to capillary forces is eliminated. Moreover, the curable compound is toughened and obtains an increased stiffness after the pre-curing, whereby the curable compound is better able to withstand the forces exerted by the polishing means and thus dimpling can be minimised. The removal of excessive curable compound using a squeegee may also be influenced by capillary forces dragging curable compound out from the recesses and onto the intermediate surfaces and is can be avoided by taking actions to obtain a suitably high viscosity.

As compared to the similar filling operation performed when filling embossed cavities or cast cured cavities in a substrate sheet with ink in prior art products the matrix provides higher rigidity and hence new opportunities with regards to removal of excessive curable compound. The substrate sheets used in the prior art are simply too weak to withstand the forces exerted thereon during polishing.

In one embodiment of the method of the invention one or more additional product features 2 are provided in or on the substrate sheet 5 by embossing in the substrate sheet 5 or applying a coating 6 to the surface of the substrate sheet 5, each additional product feature 2 being associated with a printed product feature 3 on the opposite side of the substrate sheet 5 thereby forming a focusing element 2 and an image object 3 pair for a synthetic image device. The product features 2, 3 can be provided in any order, i.e. additional product features 2 followed by printed product features 3, or printed product features 3 followed by additional product features 2, or all product features 2, 3 at the same time.

Further additional product features can also be provided independently or aligned with product features 2, 3 with the same processes or different processes. The substrate sheet 5 may also be provided with product features pre-formed in or on the substrate sheet 5.

In one embodiment of the invention curable compound 13 is repeatedly applied to the surface 9 of the matrix 8, optionally with intermediate removal of excessive curable compound 13, whereby any lack of filling of the recesses 12 from previous steps of applying and removing can be remedied. For example, whereas comparatively small recesses normally are completely filled at once, as recesses 12 are comparatively large they may be incompletely filled by only one iteration of the steps of applying and removing curable compound. One object of this iteration is to improve perceived contrast in an image represented by the product features and intermediate surfaces.

The printing process of the invention can be improved by pre-treatment of the substrate sheet 5 prior to printing. During transfer of the curable compound 13 the adhesion between the curable compound 13 and the substrate sheet 5 has to overcome the forces holding the curable compound 13 in the recesses 12. The adhesion between the curable compound 13 and the substrate sheet 5 during the step of transferring can be improved by a pre-treatment comprising surface modification and/or deposition of a surface layer 6 on the substrate sheet surface 7 that is intended to receive the curable compound 13. The surface layer 6 functions as an adhesive layer in the step of transferring. The pre-treatment is of increased importance when pre-curing the curable compound before transferring since this typically reduces the inherent adhesive properties of the curable compound, or at least the wetting properties of the curable compound. These adhesive, or wetting properties, can be improved by the appropriate pre-treatment of the substrate sheet before printing.

An important aspect of the product properties is the substrate sheet thickness since this at least partly determines the alignment in the thickness direction of product features on opposed sides of the substrate sheet 5. During pre-treatment, the substrate sheet thickness can be modified by the deposition of a surface layer 6 comprising a curable material on one or both sides of the substrate sheet 5 in order to form an offset layer on the substrate sheet 5. The thickness of this offset layer can be controlled and, if necessary, varied during production.

The surface layer 6 preferably comprises a curable material and in similar processes is often referred to as a lacquer. However, the curable layer 6 may also additionally comprise non-curable constituents. FIG. 2 schematically indicates the interface between the cured surface layer 6 and the substrate sheet 5 with a first dotted line. The cured surface layer 6 may be of the essentially same material as the substrate sheet 5 or a different material. A second dotted line indicates a layer defined by an embossing process or a cast cure process for forming additional product features such as product features 2, schematically illustrated as micro lenses in FIG. 2.

The step of surface modification may include the deposition of different primers or solvents, etching etc. in order to modify the surface properties of the substrate sheet 5 to obtain improved adhesion of the curable compound 13 to the substrate sheet 5. Surface modification can be applied alone or in addition to the deposition of a surface layer 6, e.g. surface modification can be used to improve the adhesive properties of the surface layer 6 or to improve adhesion to the surface layer 6. An increase in adhesion is typically accomplished by an increase of the surface energy of the surface 7 of the substrate sheet 5.

In one embodiment of the invention a surface layer 6 comprising a curable material is applied to the surface 7 of the substrate sheet 5 that is intended to face the matrix 8 when transferring of the curable compound 13 thereto. Preferably the surface layer 6 is cured after being brought into contact with the matrix 8 and the curable compound 13 of the recesses 12. The surface layer 6 may also in addition be pre-cured to some extent prior to contact with the matrix 8, and/or cured after being withdrawn from the matrix 8.

In optical applications the surface layer 6 and the surface modified portion of the substrate sheet 5 are preferably transparent.

Filling and selective removal of curable compound can be assisted by manipulation of the surface properties of the matrix 8, i.e. by having comparatively hydrophilic recesses and comparatively hydrophobic intermediate surfaces between the recesses. This can be accomplished e.g. by having a Ni matrix with cavities filled with silicone, etching recesses so as to obtain a surface texture in the recesses that provides a more hydrophilic surface than the intermediate native surfaces, or coating of intermediate surfaces with hydrophobic polytetrafluoroethylene or the like.

Figure 3:
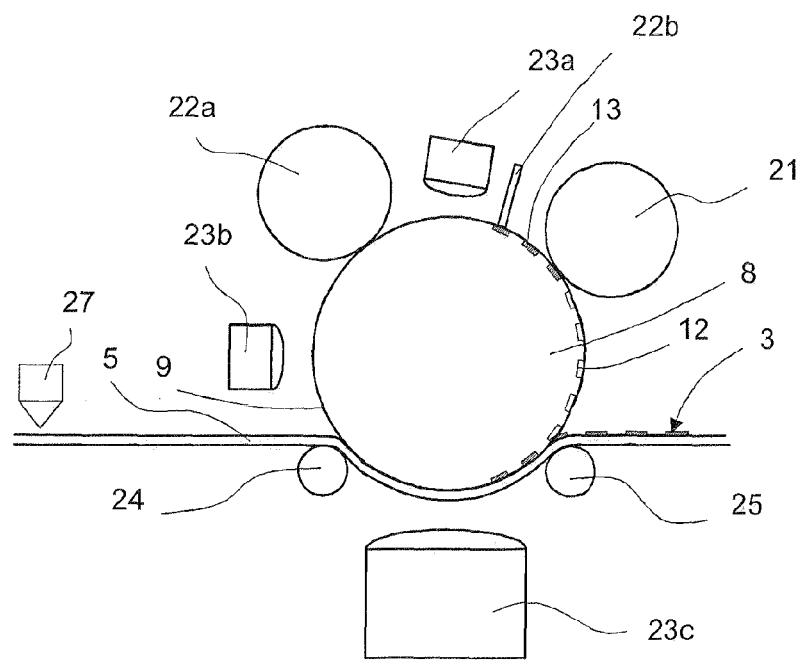
FIG. 3 schematically illustrates one embodiment of a roll-to-roll arrangement for production of a product according to the invention.

Referring to FIG. 3, the matrix 8 is preferably provided on a roll and at least the transferring of the curable compound 13 is performed in a roll-to-roll process wherein at least the printed product features 3 are continuously formed on a substrate sheet 5 that is brought into rolling contact with a matrix roll 8.

An arrangement for production of a product with printed product features 3 arranged on a surface 7 of a substrate sheet 5 in a continuous process along a substrate sheet 5 in accordance with the present invention comprises:
  a matrix roll 8 arranged to be in rolling contact with the substrate sheet 5, the matrix roll 8 comprising a circumferential surface 9 with a plurality of recesses 12;
  an applicator 21 arranged for application of a curable compound 13 onto the circumferential surface 9 and the recesses 12 of the matrix roll 8;
  removal means 22a arranged for the removal of excessive curable compound 13 from the circumferential surface 9 of the matrix roll 8 after application of curable compound 13 with the applicator 21; and
  curing means 23a for increasing the viscosity of the curable compound 13;
  whereby remaining curable compound 13 filling the recesses is transferred to the substrate sheet 5 during rolling contact between the matrix roll 8 and the substrate sheet 5 in order to form the printed product features 3.

Analogous to the reasoning above, the arrangement for continuous production can be appreciated as being similar to an arrangement for printing.

FIG. 3 schematically illustrates a cross sectional view of one embodiment of such an arrangement for continuous production. Means for applying the curable compound, means for curing the curable compound 23a and/or adhesive layers of the substrate sheet 5, means for removing excessive curable compound 13 and means for holding the substrate sheet 5 in rolling contact with the matrix roll 8 are arranged around the matrix roll 8. The applicator 21 and the removal means 22a are illustrated as rolls, however not limited to this. The substrate sheet 5 is in FIG. 3 preferably guided by a pressure roll 24 and a peeling roll 25. As appreciated by a person skilled in the art the precise placement of rolls, removal means and curing means is not limited to the set-up shown in FIG. 3. Moreover, additional rolls, removal means and curing means may be arranged around the matrix roll and/or at the substrate sheet in order to accomplish the embodiments of the method as described above, for example additional applicators and removal means would need to be arranged at the matrix roll to accomplished the iteration of the steps of applying and removing.

In operation, a substrate sheet 5 is provided and fed between the pressure roll 24 and the matrix roll 8 and then between the peeling roll 25 and the matrix roll 8, whereby the substrate sheet 5 is brought into rolling contact with the matrix roll 8 around a portion of the circumferential surface 9 of the matrix roll 8. At a first position around the matrix roll 8 a curable compound 13 is applied to the matrix roll 8 whereby the recesses 12 in the surface 9 of the matrix roll are at least partly filled with curable compound 13. Preferably the viscosity of the curable compound is adapted to enable it to fill the smallest recesses. Excessive curable compound 13 outside the recesses is removed by removal means 22a arranged at a second position around the matrix roll 8. At a third position the substrate sheet 5 is brought into contact with the surface 9 of the matrix roll 8 and the curable compound 13 in the recesses. The curable compound adheres to the substrate sheet 5. When the substrate sheet 5 is released from the circumferential surface 9 of the matrix roll 8 at the peeling roll 25 the curable compound 13 in the recesses 12 is peeled out from the recesses and thereby transferred to the substrate sheet 5 to form the product features on the substrate sheet 5.

The removal means 22a, 22b comprises a squeegee and/or a polishing means. One example of a polishing means is a fibre cloth arranged on a roll that is arranged to contact the matrix roll surface. Two or more removal means 22a, 22b can be arranged in sequence to efficiently remove excessive curable compound, e.g. a squeegee followed by a polishing means. Thereby the amount of excessive curable compound left on intermediate surfaces can be minimised, which improves the polishing.

Preferably curing means 23a for increasing the viscosity of the curable compound 13 before removal of excessive curable compound 13 is arranged at least in-between the applicator 21 and the removal means 22a. Optionally removal means 22b is arranged at a position between the applicator 21 and the curing means 23a to permit a coarse removal of excessive curable compound. For example, the curing means 23a is used to at least partly the curable compound 13. Thereby the viscosity of the curable compound 13 can first be optimised for filling of the curable compound into the recesses 12 and then optimised by at least being partly cured to permit efficient removal of excessive curable compound 13 without removing curable compound from within the recesses 12. The curable compound is at this step not necessarily fully cured, indeed it does not have to be cured at all when viscosity is increased by other means. Additional curing may be performed at subsequent steps. Depending on the mechanism used for increasing the viscosity different curing means, such as a lamp (UV, infrared, etc.), a heat source, a cooling means or an electron beam gun, may be used.

In one embodiment of the invention curing means 23b is in addition arranged in sequence with the removal means 22a at a position prior to where the matrix roll 8 is brought into rolling contact with the substrate sheet 5. At this position the curable compound 13 can be cured (or further cured, if it has been partly cured before) but not necessarily fully cured.

Curing means 23c arranged at a position where the matrix roll 8 is in rolling contact with the substrate sheet 5 can be used for additional curing, or, if no curing has been made previously, a first curing, of the curable compound 13 in the recesses before transfer of the curable compound from the recesses to the substrate sheet 5. This curing means 23c can also be used to cure a surface layer 6 on the substrate sheet 5.

Curing means 23a to increase the viscosity by changing the temperature of the curable compound can also be integrated in the matrix roll 8.

The arrangement for continuous production is in one embodiment of the invention provided with means for pretreatment 27 of the substrate sheet 5 prior to transfer of the curable compound 13 to the substrate sheet 5. As illustrated in FIG. 3 the means for pre-treatment 27, such as an applicator roll or spray coating means, is arranged at the substrate sheet 5 at a position prior to where the substrate sheet 5 is brought into rolling contact with the matrix roll 8.

As mentioned above, during production the substrate sheet thickness can be controlled, and if necessary adjusted, by depositing an offset layer on the substrate sheet 5 before printing. This can be accomplished using means for registering the mutual alignment of product features arranged on opposed sides of the substrate sheet at a position after the substrate sheet 5 leaves the matrix roll 8. One example of such means for registering mutual alignment is disclosed in WO 2009/085004.

In a further embodiment of the present invention illustrated schematically in FIG. 4, the arrangement further comprises means 28, 29 for providing additional product features 2 on the substrate sheet 5 on one side of the substrate sheet or both. The means for providing additional product features comprises means based on different techniques and process types such as, different types of printing, embossing, continuous casting, surface coating, laminating, or combinations thereof. Examples of printing techniques comprise screen printing, offset printing, flexographic printing, ink-jet printing and printing in accordance with the method of the present invention. Preferable the arrangement further comprises means for aligning associated product features with each other.

FIG. 4 schematically illustrates one embodiment of an arrangement in accordance with the invention comprising means for providing additional product features 2 in addition to the matrix roll and the previously described means for applying curable compound, curing and removal. The substrate sheet 5 is fed from a feed roll 30 to a first means 28 for providing additional product features 2. For example, said first means 28 is an embossing roll or a cast cure station, however said first means is not limited to this, that forms additional product features 2 in the form of micro lenses on one side of the substrate sheet 5. Subsequently the substrate sheet 5 is fed to a second means 27 for forming additional product features. In this embodiment said second means 27 is used to apply a surface layer 6, on the surface of the substrate sheet 5 on the opposite side of the additional product features 2 before entering the nip between the pressure roll 24 and the matrix roll 8. As described above a curable compound 13 is applied to the circumferential surface 9 of the matrix roll 8 by an applicator 21 whereby the recesses 12 in the surface 9 of the matrix roll 8 are filled with curable compound 13. The applied curable compound 13 is preferably at least partly cured by curing means 23 arranged at a position between the applicator 21 and a removal means 22. After this curing of the curable compound 13 removal means 22 remove any excess curable compound 13, in particular excessive curable compound 13 between the recesses 12. As illustrated in FIG. 4 the applicator 21 and the removal means 22a may be in the form of rolls. For example a polishing roll may be used for the ultimate removal. Preferably an additional removal means 22b, such as a squeegee is arranged directly after the applicator 21 to coarsely remove excessive curable compound. After removal of excessive curable compound 13, the circumferential surface 9 of the matrix roll 8 is brought in rolling contact with the surface sheet, and hence the adhesive layer 6 on the surface thereof, by a pressure roll 24 forcing the substrate sheet 5 towards the matrix roll 8 and it is kept in rolling contact until released at a peeling roll 25 arranged on the matrix roll 8. During rolling contact between the substrate sheet 5 and the matrix roll 8 the curable compound 13 in the recesses 12 adheres to the adhesive layer 6 of the substrate sheet 5. Curing means 23 is optionally arranged to cure uncured or partly cured curable compound 13 in the recesses and/or a surface layer 6 substrate sheet 5 while being in rolling contact. When the substrate sheet is released from being in contact with the matrix roll 8 at the peeling roll the cured compound 13 is withdrawn from the recesses 12 and printed product features 3 are printed on the surface 7 of the substrate sheet 5 on the side opposite that having the additional product features 2. This example is for illustrative purpose and it should be appreciated modifications in accordance with the above described embodiments of the method and the arrangement are conceivable.

The substrate sheet is at least in the areas that contribute to generation of a synthetic integral image transparent or translucent. Other areas may be opaque or have reduced transparency. For optical applications the transparency is of uttermost importance. The substrate sheet may comprise paper, films or metal, such as aluminium. Although the above embodiments are primarily illustrated with a substrate sheet constituted by a single layer, it is not limited to this. Two or more layers can be joined by techniques known in the art or one or more surface layers can be deposited on one side or both of the substrate to achieve necessary surface properties before printing of the product features according to the invention. The substrate sheet may be cast, calendared, blown, extruded and/or biaxially extruded. The substrate sheet may comprise polymeric compounds such as any one or more selected from the group comprising polythyleneterephthalate, polymetylenemetacrylate, polypropylene propafilm, polyvinylchloride, rigid pvc, cellulose, tri-acetate, acetate polystyrene, polyethylene, nylon, acrylic and polytherimide board. Papers made from wood pulp or cotton or synthetic wood free fibres or the like can also be used. The paper may be coated, calendared or machine glazed.

Said means for providing product features, including the matrix or matrix roll, may involve a printing plate. Such a printing plate is preferable fabricated using microfabrication methods such as photolithographic techniques, which are well known in the field of microsystems technology and microelectronics. Preferably direct writing using a laser writer is used. This enables very high resolution, i.e. better than 0.5 µm. The master structure is a negative copy of the printing plate and can be used to manufacture numerous printing plates. The pattern of the master structure can be transferred to the matrix by replication. Nickel (Ni) is a suitable material for replicated printing plates and plates made of this material are plated on the master. A printing plate manufactured with microfabrication methods generally does not have the rigidity required for the means for providing product features according to the invention. Thus the printing plate is preferably attached to a carrier that provides the necessary rigidity. In the above described roll-to-roll process the printing plate can be attached to the surface of a roll to form the matrix roll 8.

As mentioned above, the method of the invention has similarities with Intaglio printing. In intaglio printing the matrix is commonly made of copper (Cu). In Intaglio printing ink is applied to the surface of the matrix and excessive ink is removed using a squeegee. Since Ni is more prone to wear than e.g. Cu, the final removal of excessive ink, i.e. curable compound, is preferably made by polishing when using a Ni matrix. Thereby the life time of the printing plate and the reproducibility of the product features are improved.

The wear resistance of the matrix roll can be improved by surface treatment, such as hardening and/or deposition of thin wear resistant coatings, for example TiN.

In one embodiment of the present invention supporting structures are provided in the recesses 12 of the matrix 8 in order to improve filling of large recesses by use of capillary forces.

FIG. 5 schematically illustrates two recesses 12a, 12b being filled with a curable compound 13 according to the invention. Supporting structures 20, such as pillars or ridges, are provided in the recesses 12a, 12b. Liquid curable compound fills both a small recess 12a and a larger recess 12b. The width of the supporting structures is preferably adapted to be so small that any artefacts in the geometry of the printed product features caused by them will not be perceived by an observer when the product is in normal use. The height of the supporting structures 20 typically equal to the depth of the recesses due to fabrication issues, however is not limited to this. The distance between the supporting structures is adapted so that capillary forces can act on the curable compound filled into the recesses to enable complete filling of the recesses. Preferably when the printed product features are used in optical devices the supporting structures are distributed in a disordered manner to reduce artefacts as if the supporting structures are arranged in an ordered array, small artefacts of the printed product features originating from the supporting structures may be perceived in normal use.

Figure 7A:
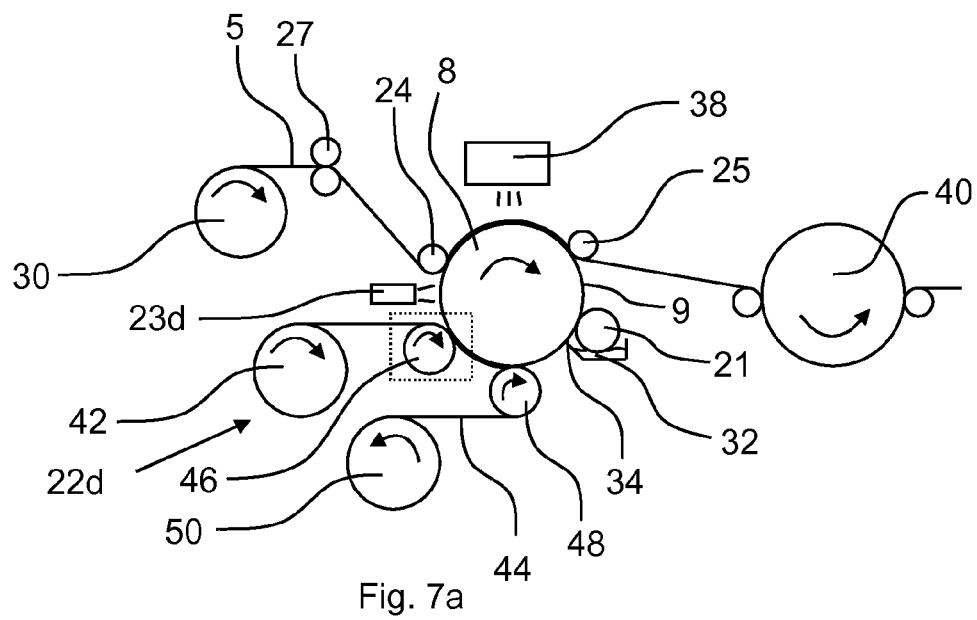
FIG. 7a schematically illustrates a wiping arrangement in accordance with the invention.
Figure 7B:
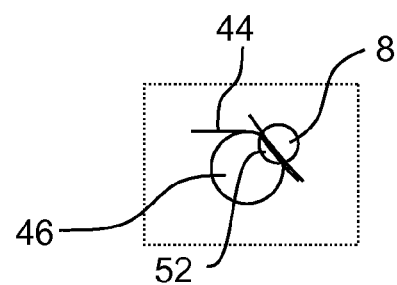

FIGS. 7a and 7b illustrate another example of an arrangement for production of a printed substrate sheet 5 according to the invention. The production arrangement comprises a matrix roll 8, having recesses 12 formed on its surface 9 for receiving a curable compound 13, such as an ink, in a pattern negatively corresponding to the desired pattern of product features 3 to be printed. The recesses are filled with the curable compound by an applicator roll 21 arranged to collect curable compound from a tray 32 and to transfer the curable compound to the matrix roll by direct contact with the matrix surface. Due to the low viscosity of the curable compound it flows easily and completely into the recesses on the matrix surface. The tray is further provided with a squeegee 34 arranged to shave off the matrix surface from curable compound, so as to remove excess curable compound on ridges between the recesses, and to return at least a part of the removed curable compound to the tray. The production arrangement further comprises a wiping arrangement 22d for wiping the matrix surface of any remaining excess curable compound, which wiping arrangement will be described in closer detail below. A curing means 23d cures the curable compound partly so as to increase the viscosity of the curable compound.

The production arrangement further comprises a feeding roll 30 having a substrate sheet wound onto the roll and arranged to feed a web of the substrate sheet towards two pre-treatment rolls 27 and then further to the matrix roll. The two pre-treatment rolls apply a curable adhesive layer onto the substrate sheet for the purpose of increasing the adhesion between the substrate sheet and the curable compound on the matrix roll. The nip between the two pre-treatment rolls ensures an appropriate thickness of the adhesive layer. The substrate sheet is then brought into contact with the matrix roll by a pressure roll 24, wherein the adhesive layer contacts with the already partly cured compound in the recesses 12. A second curing means 38 cures the curable adhesive layer and the curable compound together to form an integrated layer onto the substrate sheet. The substrate sheet is removed from the matrix roll with a peeling roll 25, wherein the cured compound follows the substrate sheet and is drawn out of, or peeled from, the recesses. The substrate sheet may then be conveyed to a second printing or treatment arrangement 40, or a second matrix roll, for further treatment, such as for printing of additional product features on the opposite side of the substrate sheet, or for the application of a protective layer onto the newly formed product features.

The wiping arrangement 22d, as shown with reference to FIGS. 7a and 7b, comprises a first storage roll 42 having the web of wiping material 44 wound-up on the roll, and arranged to feed the web on toward the wiping rolls. The first 46 and second 48 wiping rolls are positioned with their surfaces in contact with the matrix surface 9, but spaced apart from each other. Hence, the web of wiping material will follow the curvature of the matrix surface and lightly brush against the matrix surface with a pressure largely decided by the length of the web between the wiping rolls compared with the actual distance between the rolls. The wiping rolls are arranged to turn in the opposite direction relative to the turning of the matrix roll, wherein the web of wiping material will pass in a counter direction relative to the movement direction of the matrix surface. This increases the amount of curable compound wiped up by the web, as well as ensuring that a clean web portion is the last portion wiping the matrix surface at the end of the wiping arrangement. The turning speed of the wiping rolls is set to be sufficiently high to ensure the feeding of a sufficiently clean web of wiping material across the matrix surface, and sufficiently low to ensure a low contact pressure between the web and the matrix, sufficient time for absorption of the curable compound, and a low level of disturbance of the curable compound left in the recesses. An exemplary feeding speed is about 0.5-2 cm/s. The wiping arrangement further comprises a second storage roll 50 for rolling up and storing the used and now dirty web of wiping material.

The wiping rolls are provided with support surfaces 52 supporting the web of wiping material and for pressing the web of wiping material onto the matrix surface. With this invention it has been realised that the application pressure of the wiping rolls onto the matrix should be very light in order to wipe off excessive curable compound while letting the curable compound in the recesses remain. The support surface is therefore made sufficiently soft so as to yield to the shape of the matrix surface, as illustrated in the magnification of the nip in FIG. 7b. The support surface may for example be made in a soft polymer foam material, or any other material having similar material properties. Additionally, the web of wiping material is also preferably soft, and preferably fibrous and porous to allow absorption. For example, the wiping material may be a cloth, a web of paper tissue, textile, non-woven, or similar. Additionally, the pressure with which the wiping rolls are pressed onto the matrix surface should be very low. Hence the web of wiping material follows the curvature of the matrix surface without being pushed into the recesses, and thus avoids pulling up the curable compound.

The diameters of the wiping rolls are further at least 15% of the diameter of the matrix roll, more preferably at least 25%. In this example the diameters are about one third of the diameter of the matrix roll. This gives the advantage of a shallow leaving angle for the web of wiping material relative to the surface of the matrix roll at the end of the wiping process, which further decreases the problems with pulling up any curable compound from the recesses.

The method and the arrangement of the present invention enable printing of printed product features on substrate sheets with accuracy in printing with respect to lateral resolution, edge definition and dimensional tolerances in three dimensions that is not achievable with conventional printing techniques. Moreover, the method and arrangement provides continuous processing, which enables this accuracy to be obtained on large surfaces. In particular products comprising printed product features ranging in lateral size from 0.5 µm×0.5 µm to centimeter-sized features having a height of 0.5 µm to 5 µm, preferably 1 to 3 µm, hence yielding an aspect ratio varying from 4:1 (height:width) to 1:10000, can be formed. The smallest features can for example be as small as 0.5 µm×0.5 µm×2 µm or 1 µm×1 µm×1 µm. FIG. 6 schematically illustrates a top view of printed product features of varying size in accordance with the invention. The smallest printed product features are 0.5 µm×0.5 µm. As mentioned above, when lateral dimensions vary this much and the product includes µm-sized features, i.e. recesses, the filling of the curable compound is challenging. In order to fill the small recesses the viscosity needs to be comparatively low. This imposes a problem for large recesses since the capillary forces cannot help in filling these large structures. Instead surface tension may play a significant role. Moreover, the invention enables accurate alignment of product features over large distances on the substrate sheet.

All references to height, width, thickness direction, lateral etc are introduced for the easy of understanding only, and should not be considered as limiting to specific orientation. Further the dimensions of the structures in the drawings are not necessarily to scale. For example the size of the product features 2, 3 is strongly exaggerated.

While the invention has been described in connection with what is presently considered to be the most practical and preferred embodiments, it is to be understood that the invention is not to be limited to the disclosed embodiments, on the contrary, it is intended to cover various modifications and equivalent arrangements within the appended claims.

The invention claimed is:

1. A method of producing a product comprising printed product features (3) arranged on a surface (7) of a substrate sheet (5), comprising the steps of:
   providing a matrix (8) comprising a matrix surface (9) with a plurality of recesses (12);
   applying a curable compound (13) to the matrix surface (9) and the recesses (12) to fill the recesses (12) with a curable compound (13);
   increasing the viscosity of the curable compound (13);
   removing excess curable compound from the matrix surface outside the recesses (12); and
   transferring the curable compound (13) in the recesses (12) to the surface (7) of the substrate sheet (5) by bringing the matrix (8) in contact with the surface (7) of a substrate sheet (5), whereby the curable compound forms (13) the printed product features (3) on the surface (7) of the substrate sheet (5);

wherein the step of increasing the viscosity comprises at least partly curing (23*a*) the curable compound (13) before removal (22*a*) of excess curable compound.

2. The method of claim 1, wherein the step of removing comprises polishing.

3. The method of claim 2, wherein the curable compound (13) is cured during contact between the substrate sheet (5) and the matrix (8).

4. The method of claim 1, wherein the curable compound (13) is cured during contact between the substrate sheet (5) and the matrix (8).

5. The method of claim 1, further comprising the step of applying a surface layer (6) on the surface (7) of the substrate sheet (5) facing the matrix (8) before transfer of the curable compound (13) thereto.

6. The method of claim 5, wherein the surface layer (6) comprises a curable compound for improving the adhesion of the curable compound (13) to the substrate sheet (5).

7. The method of claim 1, wherein the matrix (8) is provided on a matrix roll and at least the transferring of the curable compound (13) is performed by a roll-to-roll process.

8. The method of claim 1, further comprising providing additional product features (2), each additional product feature (2) being associated with a printed product feature (3) on the opposite side of the substrate sheet (5), the printed product features (3) and the additional product features (2) forming image objects and focusing elements for a synthetic image device, respectively.

9. The method of claim 1, wherein the recesses (12) comprises supporting structures (20).

10. The method of claim 1, wherein the step of removal of excess curable compound from the matrix surface comprises wiping the matrix surface with a soft wiping material able to at least partly absorb the curable compound.

11. The method of claim 10, wherein the wiping comprises conveying a web of the wiping material from a first wiping roll to a second wiping roll, both wiping rolls being in contact with the matrix surface.

12. The method of claim 1, wherein the product features (3) are printed directly on the surface (7) of the substrate sheet (5) or on one or more layers (6) arranged on the substrate sheet (5) without pre-structuring the substrate sheet (5) or the layer(s) (6) for filling and on a side of the substrate sheet (5) opposite a side on which an array of micro lenses (2) is arranged.

13. An arrangement for continuous production of a product with printed product features (3) arranged on a surface (7) of a substrate sheet (5) comprising:

a matrix roll (8) comprising a circumferential surface (9) with a plurality of recesses (12) arranged to be brought into rolling contact with the substrate sheet (5);

an applicator (21) arranged for application of curable compound onto the matrix roll (8);

removal means (22*a*) arranged for removal of excessive curable compound from the circumferential surface (9) of the matrix roll (8) after application of curable compound (13) with the applicator (21); and curing means (23*a*) arranged at least in-between the applicator (21) and the removal means (22*a*) for increasing a viscosity of the curable compound (13) before removal of excessive curable compound (13);

whereby remaining curable compound filling the recesses (12) is transferred to the substrate sheet (5) during rolling contact between the substrate sheet and the matrix roll.

14. The arrangement of claim 13, wherein the curing means is arranged to increase the viscosity of the curable compound by at least partly curing the curable compound (13).

15. The arrangement of claim 14, further comprising means for providing additional product features (2), each additional product feature (2) being associated with a printed product feature (3) on the opposite side of the substrate sheet (5), the printed product features (3) and the additional product features (2) forming image objects and focusing elements for a synthetic image device, respectively.

16. The arrangement of claim 13, further comprising first and second wiping rolls arranged in contact with the matrix surface for conveying a web of wiping material from the first roll to the second roll.

17. The arrangement of claim 16, wherein the wiping rolls comprises a support surface for supporting the web, which support surface is sufficiently soft to yield to the shape of the matrix surface.

* * * * *